United States Patent [19]

Andersson et al.

[11] 4,271,662
[45] Jun. 9, 1981

[54] MACHINE FOR HARVESTING THE FOLIAGE OF ROW CROPS

[75] Inventors: Alf H. Andersson, Ödåkra; Nils B. Glifberg, Staffanstorp, both of Sweden

[73] Assignee: Svenska Sockerfabriks AB, Malmo, Sweden

[21] Appl. No.: 75,464

[22] Filed: Sep. 14, 1979

[30] Foreign Application Priority Data

Sep. 21, 1978 [SE] Sweden .............................. 7809924

[51] Int. Cl.³ ........................................... A01D 23/00
[52] U.S. Cl. .................................... 56/121.44; 56/13.4
[58] Field of Search ...................... 56/12.8, 12.9, 13.1, 56/13.2, 13.3, 13.4, 121.44, 121.45, 121.4, 53, 500, 501

[56] References Cited

U.S. PATENT DOCUMENTS

| | | | |
|---|---|---|---|
| 3,073,098 | 1/1963 | Farrar et al. | 56/13.3 |
| 3,766,723 | 10/1973 | Maier et al. | 56/13.3 |
| 3,855,760 | 12/1974 | Smith et al. | 56/13.2 |
| 4,064,681 | 12/1977 | Glifberg | 56/121.45 |

FOREIGN PATENT DOCUMENTS 1240277  7/1971  United Kingdom ..................... 56/13.4

*Primary Examiner*—Robert A. Hafer
*Attorney, Agent, or Firm*—Beveridge, DeGrandi and Kline

[57] ABSTRACT

A machine for harvesting the overground foliage of a row crop growing in a field. The machine has a plurality of stripping wheels each for harvesting and disintegrating the foliage in one row of the crop. Each stripping wheel is arranged in a casing having an obliquely upwardly directed outlet, and produces an air stream for transporting the disintegrated foliage up through the outlet of the casing. In order to attain great cutting efficiency per time unit and keep the harvested material as clean as possible, the machine has a collecting channel connected at one end to an ejector pipe. The collecting channel extends above the stripping wheel casings which are arranged in a row one beside the other and whose outlets extend obliquely upwards in the same direction towards the ejector pipe and open at intervals one after the other into a lower portion of the collecting channel. Besides, the lower portion of the collecting channel is at that side of each outlet of the wheel casing that faces the ejector pipe, provided with nozzles for injecting additional air into the collecting channel substantially in the direction of the ejector pipe end of the collecting channel.

5 Claims, 5 Drawing Figures

MACHINE FOR HARVESTING THE FOLIAGE OF ROW CROPS

The present invention relates to a machine for harvesting the overground foliage of row crops growing in a field, which machine can be advanced in the field along the rows of the crop by drive means and has a plurality of juxtaposed stripping wheels each for a respective row of the crop, said wheels being disposed each in one casing provided with an obliquely upwardly directed outlet, and having wings adapted to disintegrate the foliage of the row crop and to produce an air stream for discharging the disintegrated foliage through the outlet of the casing of the respective stripping wheel.

For some types of row crops, it is sometimes desirable to harvest the overground foliage of the crop while it is growing in a field. Typical examples are harvesting of the tops of sugar beets, fodder beets and red beets. Machines have already been designed for this purpose but these conventional machines have a small cutting capacity per time unit and/or soil the harvested foliage to a considerable extent. Besides, most of the prior art machines cannot sever the foliage at desired, varying heights above the ground.

The object of the present invention is to provide a machine for such harvesting, which has a great cutting or harvesting capacity per time unit, permits serving of the foliage at a desired, variable height above the ground, and which produces a harvested material which has practically the same degree of cleanness as had the material when growing in the field.

To this end, the machine of the invention comprises a collecting channel connected at one end to an ejector pipe and extending above the aligned juxtaposed stripping wheel casings the outlets of which extend obliquely upwards in the same direction towards the ejector pipe and open at intervals in a succession in a lower portion of the collecting channel, and the lower portion of the collecting channel at that side of the outlet of each stripping wheel casing that faces the ejector pipe, is provided with air supply means for injecting additional air into the collecting channel substantially in the direction of the ejector pipe end of the collecting channel.

The invention will be described in greater detail hereinbelow with reference to the accompanying drawings, in which.

Figure 4:
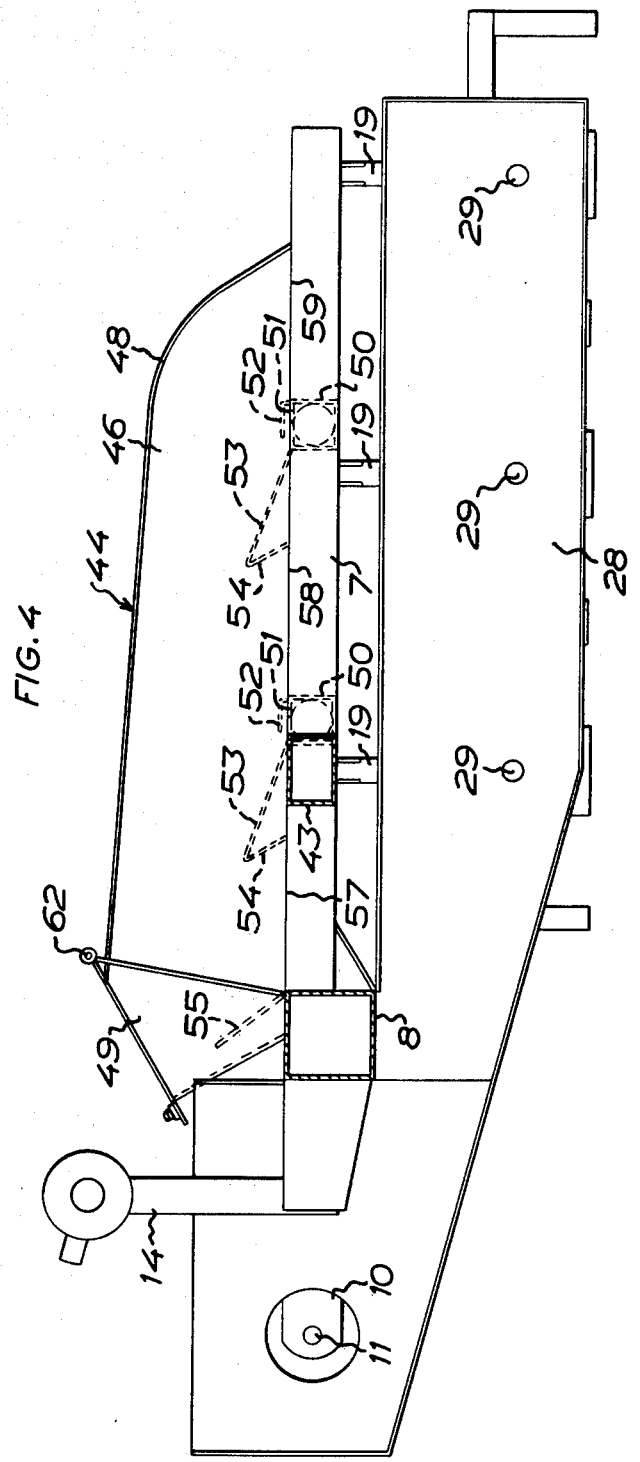
FIG. 4 is a rear view of a portion of the machine, some parts being removed to avoid crowding of the drawing.
Figure 5:
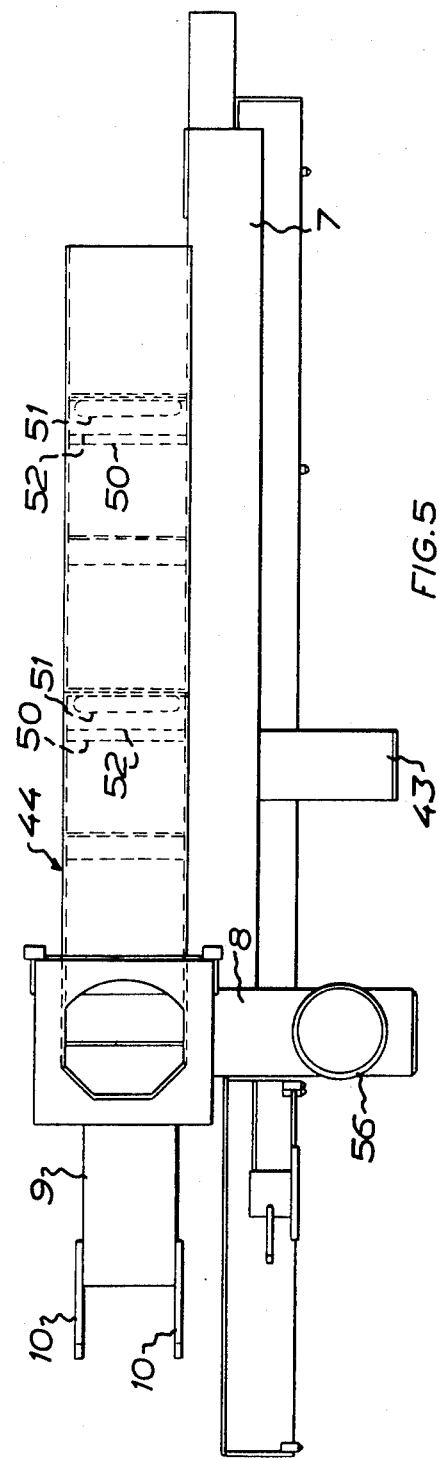
FIG. 5 is a top plan view of the machine portion of FIG. 4.

The machine shown in the drawings is designed to be carried by a conventional three-point suspension device on an agricultural tractor, to be advanced in a field along the rows of a crop growing in the field. To this end, the machine has a frame 1 with pins 2 and lugs 3 for connection to the three-point suspension device of the tractor. On the frame 1 there is mounted a grooved pulley 4 driven by the power take-off of the tractor and connected by a V-belt 5 to a grooved pulley (not visible in FIG. 1) which is rotatable on a shaft 6 mounted on the frame 1. A hollow supporting beam 7 laterally projecting from the frame 1 is, by means of hollow beam sections 8, 9 (see FIGS. 4 and 5) and a pair of lugs 10, swingably mounted at one end to the shaft 6 extending through holes 11 (FIG. 4) in the lugs 10. The cylinder 12 of a hydraulic piston and cylinder assembly is pivotally connected at one end to the frame 1, whereas the piston rod 13 of the assembly is pivotally connected to the supporting beam 7.

Figure 1:
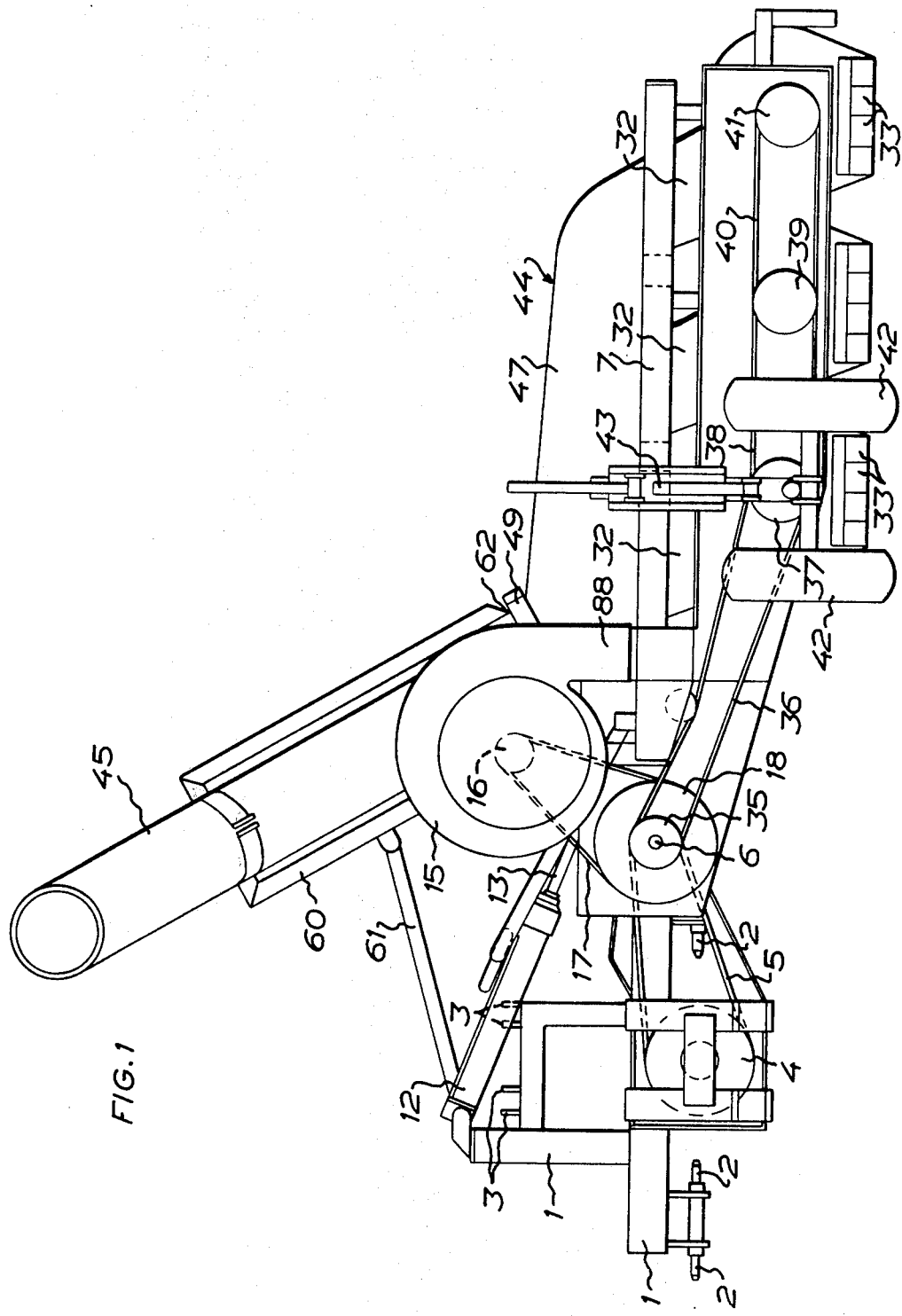
FIG. 1 is a rear view of a machine according to the invention.

By supplying pressure fluid to the piston and cylinder assembly 12, 13, the supporting beam 7 may thus be swung between the substantially horizontal prosition shown in FIG. 1, in which the supporting beam projects laterally from the frame 1 and from the tractor carrying the frame, and a raised position, in which the supporting beam is directed substantially straight upwards and which is used, for instance, when the tractor is to transport the machine to and from a field where a row crop is grown.

The supporting beam 7 carries by means of a post 14 (FIG. 4) a fan 15 for additional air. The fan 15 is provided with a grooved driving pulley 16 (FIG. 1) which by means of a V-belt 17 is driven by a grooved pulley 18 mounted on the shaft 6 and fixedly connected to the groved pulley (not shown) which is driven by the V-belt 5. The outlet 88 of the fan 15 is connected to the interior of the hollow supporting beam 7.

The supporting beam 7 carries by means of three rods 19 projecting downwards from the supporting beam and a horizontal supporting girder 20 (FIG. 3) interconnecting the lower ends of the rods 19, three stripping wheels with associated casings, which are disposed underneath the supporting beam and ahead of the machine in the direction of travel thereof. The stripping wheels with associated casings should be of a type in which the wheels have wings adapted to disintegrate the foliage of the row crop and to produce an air stream for discharging the disintegrated foliage through an obliquely upwardly directed outlet from the stripping wheel casing. In order to keep the harvested material as clean as possible, it is advisable to use stripping wheels and pertaining casings of the type disclosed in U.S. Pat. No. 4,064,681, as illustrated in the drawings. Each stripping wheel has a hub 21 (FIGS. 2 and 3) on which a plurality of wings 23 twisted in a propeller blade-like fashion, are pivotally mounted by bolts 22. The hubs 21 of the stripping wheels are each secured to a shaft 24 mounted, on the one hand, in a bearing 25 fixed to a rear wall 26 of the stripping wheel casing, and, on the other hand, in a bearing 27 fixed to a front wall 28 of a casing for the encapsulation of a drive for the stripping wheels, which will be described in greater detail hereinbelow. The three stripping wheels are disposed on the same level underneath the supporting beam 7 and arranged in a row one beside the other in order, during the operation of the machine, each to engage a row of crop growing in a field. As seen in FIG. 4, the casing wall 28 has holes 29 through which the shafts 24 of the stripping wheels pass.

Figure 2:
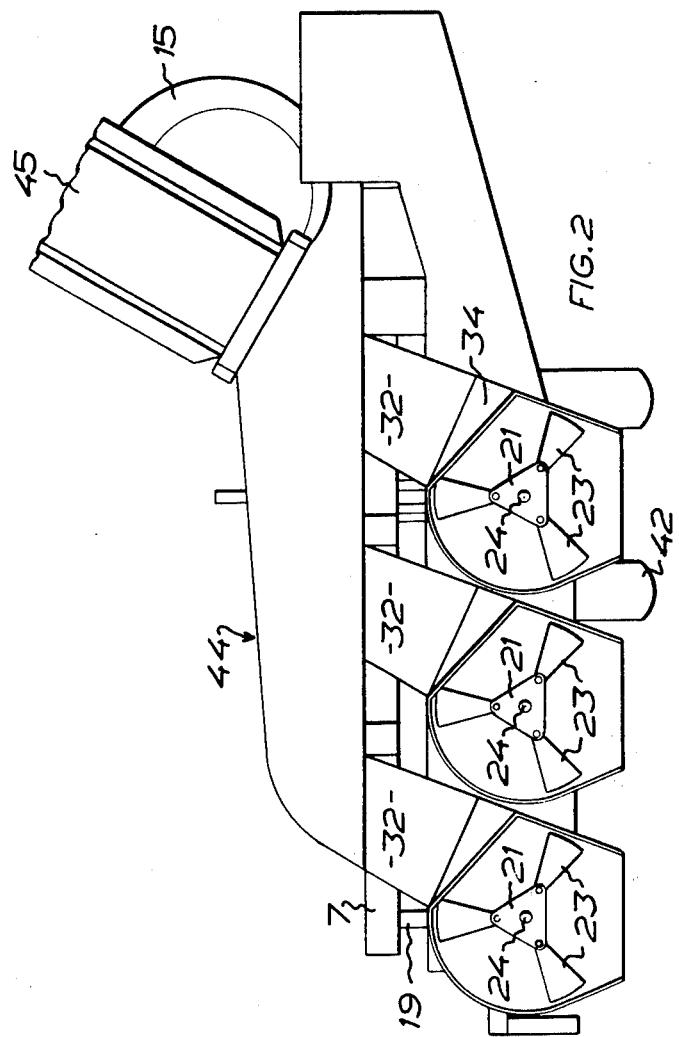
FIG. 2 shows a portion of the machine, as seen from in front.
Figure 3:
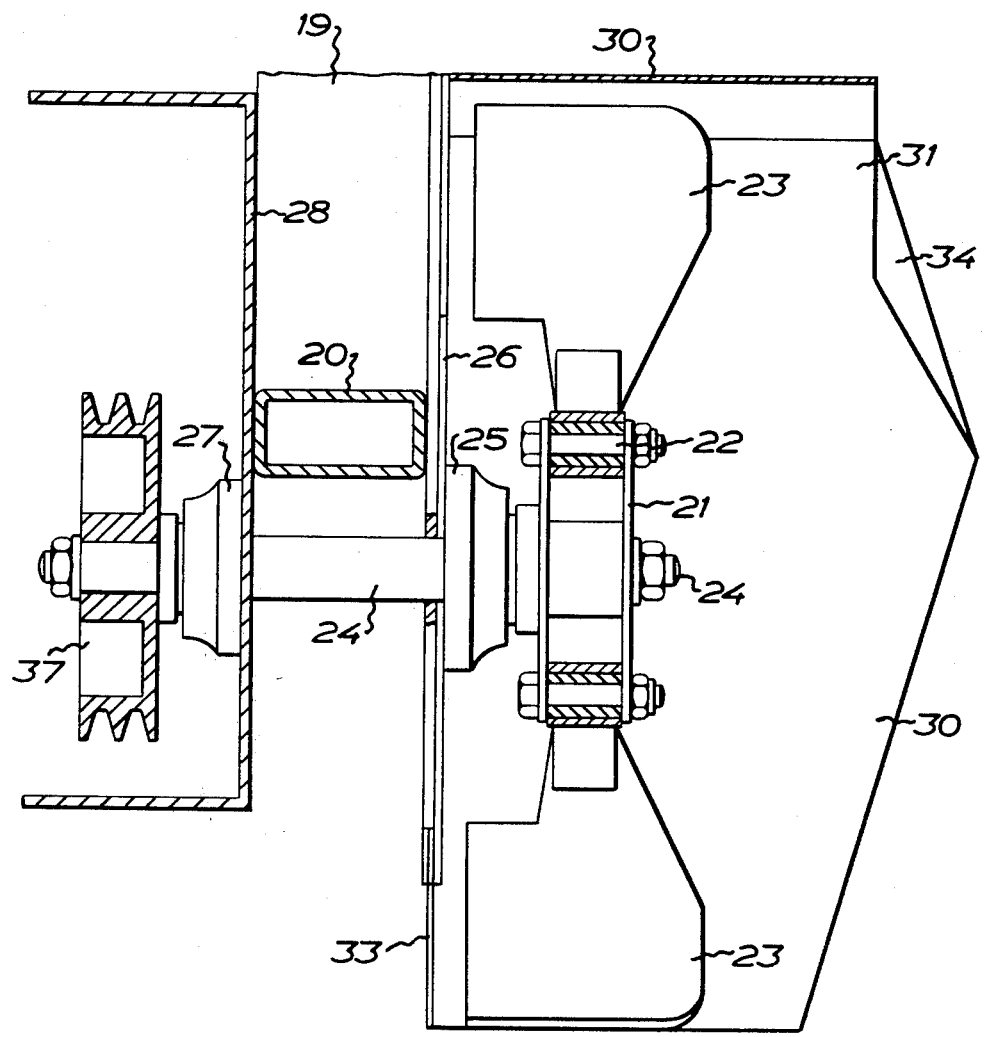
FIG. 3 is a vertical axial section of a stripping wheel with associated casing.

The casing surrounding each stripping wheel 21, 23 is illustrated in FIGS. 1-3. The casing has a substantially cylindrical circumferential portion 30 which surrounds the stripping wheel 21, 23 both laterally and upwardly but leaves the wheel free at the bottom. In the circumferential portion 30 of the casing, there is an outlet opening 31 whose center is laterally offset with respect to a vertical axial plane of the casing and the stripping wheel 21, 23. A funnel-shaped outlet 32 extends from the outlet opening 31 obliquely upwardly away from said vertical axial plane. The circumferential portion 30 of the casing is at its rear end, with respect to the direction of travel of the machine, practically completely sealed by means of the rear casing wall 26 whose lower portion consists of elastic flaps 33 which, as the machine is advancing, can yield to parts of the crop left in the ground. Except for a small screen flap 34 at the outlet opening 31 of the circumferential portion of the casing, the casing is fully open at the front in the direction of travel of the machine.

The wings 23 of the stripping wheel are twisted in a propeller blade-like fashion so as to produce an axial air stream into the casing during the rotation of the wheel in such a direction that each wing 23 from the position closest to the ground will move the shortest way to the opening 31 leading to the outlet 32. In other words, the direction of rotation of the stripping wheel 21, 23 is anit-clockwise with respect to FIG. 2 and clockwise with respect to FIG. 1. When the stripping wheel is rotating and the machine advanced towards the foliage parts of a line of a row crop growing in a field, the outer edges of the wings 23 will sever foliage parts from the crop and generate a vigorous air stream axially into the casing. This air stream is deviated by the rear wall 26 of the casing so as to be discharged through the outlet funnel 32 of the casing at a high velocity, the severed foliage being entrained by the air stream.

The three stripping wheels 21, 23 are driven in the following manner, as will appear from FIGS. 1 and 3. The shaft 6 carries a rotatable grooved pulley 35 which is fixedly connected to the grooved pulley 18 and the grooved pulley (not shown in FIG. 1) which is driven by the V-belt 5. A V-belt 36 passing over the grooved pulley 35 extends to one groove of a double-grooved pulley 37 fixedly mounted on the shaft 24 of the proximal stripping wheel 21, 23 in relation to the shaft 6. From the other groove of the pulley 37, V-belt 38 extends to one groove of a double-grooved pulley 39 which is fixedly mounted on the shaft 24 of the intermediary stripping wheel. A V-belt 40 passes from the other groove of the pulley 39 to a single groove pulley 41 fixedly mounted on the shaft 24 of the third stripping wheel.

When the supporting beam 7 is lowered to the substantially horizontal position of FIG. 1, the supporting beam, together with associated parts, is supported on the ground by means of drive wheels 42 which are mounted vertically adjustable on a rearward projection 43 on the supporting beam 7. The vertical adjustment of the drive wheels 42 permits determining at what level above the ground the foilage of the crop shall be severed by means of the stripping wheels 21, 23.

Above the stripping wheel casings mounted in aligned juxtaposition to the supporting beam 7, a collecting channel 44 extends along the beam 7. The channel 44 is connected at one end to an ejector pipe 45. The outlets 32 of the stripping wheel casings extend obliquely upwardly in the same direction towards the ejector pipe 45 and open at intervals one after the other into a lower portion of the collecting channel 44. The channel 44 is defined by two side walls 46, 47 and an upper wall 48 which departs from a connecting portion 49 for the ejector pipe 45 and extends at a slight downward inclination towards the outlet funnel 32 of the stripping wheel casing remotest from the ejector pipe 45. The wall 48 merges into the funnel 32 along a gentle bend. The rear side wall 47 of the collecting channel is connected to the supporting beam 7, and the front side wall 46 of the collecting channel is supported by three feed pipes for additional air. One of these feed pipes consists of the beam section 8 and the other two of pipe sections 50 which are fixed to the hollow supporting beam 7 and project forwardly from it. The pipe sections 50 are closed at their front ends and communicate at their rear ends with the interior of the supporting beam 7. The pipe sections 50 have in their portion defined between the front and the rear wall 46, 47 of the collecting channel, an upwardly directed outlet slot 51 over which there is mounted a guide tongue 52 secured to the pipe 50 along the lateral edge of the slot 51 which is remotest from the ejector pipe 45. The slot 51 and the tongue 52 thus form an air injection nozzle which, when compressed air is supplied through the supporting beam 7 and the pipe 50, will direct a jet of air into the collecting channel 44 towards the end of the channel that is connected to the ejector pipe 45. For guiding this jet of air there is provided in the lower portion of the collecting channel adjacent each pipe section 50 a guide wall 53 which extends from the pipe 50 obliquely upwards towards the upper wall 48 of the collecting channel and the end of the channel that is connected to the ejector pipe 45. From the upper end of each guide wall 53 extends an obliquely downwardly directed wall portion 54 at an acute angle towards the guide wall 53. The hollow beam section 8 is closed at its front and rear ends and in the area of the collecting channel 44, this beam section has an upwardly directed outlet opening which, together with a tongue 55 in the connecting portion 49 of the collecting channel 44, forms a nozzle for the injection of additional air obliquely upwardly through the connecting piece 49 and into the ejector pipe 45. The hollow beam section 8 which communicates with the interior of the hollow supporting beam 7 is connected by a connecting piece 56 (FIG. 5) to the outlet 88 of the fan 15 (FIG. 1), such that the fan can feed compressed air through the beam section 8 and the supporting beam 7 to the three above-defined nozzles supplying additional air to the collecting channel 44.

The underside of the collecting channel has three openings 57, 58, 59 for the connection of the outlet funnels 32 of the three stripping wheel casings. The opening 57 closest to the end of the collecting channel 44 that is connected to the ejector pipe 45 is defined between the beam section 8 with the tongue 55 and the wall 54 departing from the guide wall 53 closest to the beam section 8. The intermediary connecting opening 58 is located between the pipe section 50 closest to the ejector pipe, and the wall 54 which departs from the guide wall 53 connected to the second pipe section 50. The third opening 59 is located between the pipe section 50 remotest from the ejector pipe and the downwardly bent end of the upper wall 48 of the collecting channel 44.

When the machine is in operation, foliage parts which have been harvested by the stripping wheel remotest from the ejector pipe 45 will be carried by the air stream produced by the stripping wheel, out through the outlet funnel 32 of the wheel, and pass through the opening 59 obliquely into the collecting channel 44 where the foliage together with the air stream will sweep along the upper wall 48 of the channel, shortly to be caught by the additional air stream which is produced by the fan 15, injected through the adjacent pipe section 50 and guided by the adjoining guide wall 53. The additional air stream will accelerate the foliage parts and force them to advance as a layer along the upper wall of the collecting channel 44 in the direction of the ejector pipe 45. Similarly, the foliage harvested by the intermediary stripping wheel will enter together with an air stream produced by the stripping wheel, into the collecting channel 44 through the opening 58 and approach the layer of foliage sweeping along the upper wall 48 of the collecting channel, shortly to be caught and accelerated by the additional air stream which is injected through the pipe section 50 closest to the ejector pipe, and passes along the adjoining guide wall 53. Similarly, the foliage harvested by the third stripping wheel will enter together with an air stream into the collecting channel 44 through the opening 57 and approach the layer of foliage parts coming from the other two stripping wheels and sweeping along the upper wall 48 of the collecting channel, thereafter to be accelerated together with this foilage layer by the additional air coming from the nozzle-forming tongue 55 and be discharged upwardly through the ejector pipe 45, for instance to a pick-up trailer accompanying the machine.

It is highly important that the above-defined arrangement of collecting channel 44 with nozzles and guide walls for additional air keep the harvested foliage, when introduced into the collecting channel, hovering in the air in the form of a layer sweeping along the upper wall 48 of the collecting channel and permanently subjected to acceleration. Accumulation of foliage and obstruction of the collecting channel will hereby be avoided. In a typical case, the harvested foliage and the air stream carrying it have a velocity of about 10 m/s when leaving the outlet funnels 32 of the stripping wheel casings and entering and collecting channel, while the additional air in the area of the nozzles from the pipe sections 50 and the hollow beam section 8 has a velocity of about 50 m/s. Above the upper end of the guide wall 53 remotest from the ejector pipe, the layer of foliage sweeping along the upper wall 48 of the collecting channel has been accelerated to a velocity of about 11.5 m/s, and above the upper end of the guide wall 53 adjacent the ejector pipe, the foliage layer at the upper wall 48 of the collecting channel has been accelerated to about 17.5 m/s, while the foliage in the area of the outlet of the collecting channel 44 to the ejector pipe has been accelerated to a speed of about 22.5 m/s.

The upper end of the ejector pipe 45 preferably is bent approximately along a quadrant to ensure the ejection of the harvested foliage into the field or into a pick-up trailer accompanying the harvester. The ejector pipe 45 is fixedly mounted to a frame 60. This frame is hingedly connected to the frame 1 by a link arm 61 and also hingedly connected to the connecting portion 49 of the collecting channel 44 by an articulation 62 to permit the above-defined raising of the supporting beam 7 with the parts mounted thereon about the shaft 6. During this upward pivotal movement the ejector pipe 45 is swung to a more upright position, as viewed from the back of the machine.

What we claim and desire to secure by Letters Patent is:

1. Machine for harvesting the overground foliage of row crops growing in a field while advanced in the field along the row of the crop by drive means, comprising
   (1) a plurality of juxtaposed stripping wheels each for a respective row of the crop,
   (2) a plurality of casings each enclosing one of said stripping wheels,
   (3) a plurality of obliquely upwardly directed outlets each extending from one of said casings,
   (4) wings on said stripping wheels adapted to disintegrate the foliage of the row crop and to produce an air stream for discharging the disintegrated foliage through said outlet of said casing of the respective stripping wheel,
   (5) an ejector pipe for collective ejection of the disintegrated foliage emanating from said stripping wheels,
   (6) a collecting channel connected at one end to said ejector pipe and extending above said stripping wheel casings.
   (7) said outlets of said casings extending obliquely upwards in the same direction towards said ejector pipe and opening at intervals in a succession into a lower portion of said collecting channel, and
   (8) a plurality of air supply means each discharging into the lower portion of said collecting channel at that side of said outlet of each stripping wheel casing which faces said ejector pipe for injecting additional air into said collecting channel substantially in the direction of the ejector pipe end of said collecting channel.

2. Machine as claimed in claim 1, further comprising a guide wall provided in the lower portion of said collecting channel in each interspace between two successive outlets of said stripping wheel casings, said ejector pipe, obliquely upwardly in the direction of an upper portion of said collecting channel and its ejector pipe end.

3. Machine as claimed in claim 1 or 2, wherein said air supply means comprise air injection nozzles opening into the lower portion of said collecting channel, and air feed pipes laterally connected to said nozzles.

4. Machine as claimed in claim 1 or 2, wherein said air supply means comprise air injection nozzles opening into the lower portion of said collecting channel, and air feed pipes laterally connected to said nozzles and further comprise a hollow beam to which said feed pipes are connected, and a fan connected to said hollow beam for supplying air thereto, said hollow beam extending along said collecting channel and serving to support said stripping wheel said casings, and said collecting channel.

5. Machine for harvesting the overground foliage of row crops growing in a field while advanced in the field along the rows of the crop by drive means, comprising
   (1) a plurality of stripping wheels each for a respective row of the crop and aligned side by side with substantially horizontal parallel axis of rotation extending in the advancing direction of the machine,
   (2) a plurality of aligned casings each enclosing one of said stripping wheels,
   (3) a plurality of obliquely upwardly directed aligned outlets each extending from one of said casings,
   (4) wings on said stripping wheels adapted to disintegrate the foliage of the row crop and to produce an air stream for discharging the disintegrated foliage through said outlet or said casing of the respective stripping wheel,
   (5) an ejector pipe for collective ejection of the disintegrated foliage emanating from said stripping wheel, (6) a collecting channel connected at one end to said ejector pipe and extending above and along said aligned stripping wheel casings,
(7) said aligned outlets of said casings extending obliquely upwardly in the same direction towards said ejector pipe and opening at intervals in a succession into a lower portion of said collecting channel, and
(8) a plurality of air supply means each discharging into the lower portion of said collecting channel at that side of said outlet of each stripping wheel casing which faces said ejector pipe for injecting additional air into said collecting channel substantially in the direction of the ejector pipe end of said collecting channel.

* * * * *